July 16, 1963

J. T. FRYDRYK 3,097,733

AUTOMATIC MACHINE

Filed Feb. 12, 1959

INVENTOR
JOHN T. FRYDRYK
BY
Charles A. Harris
ATTORNEY

July 16, 1963  J. T. FRYDRYK  3,097,733
AUTOMATIC MACHINE
Filed Feb. 12, 1959                                7 Sheets-Sheet 2

July 16, 1963
J. T. FRYDRYK
3,097,733
AUTOMATIC MACHINE
Filed Feb. 12, 1959
7 Sheets-Sheet 3
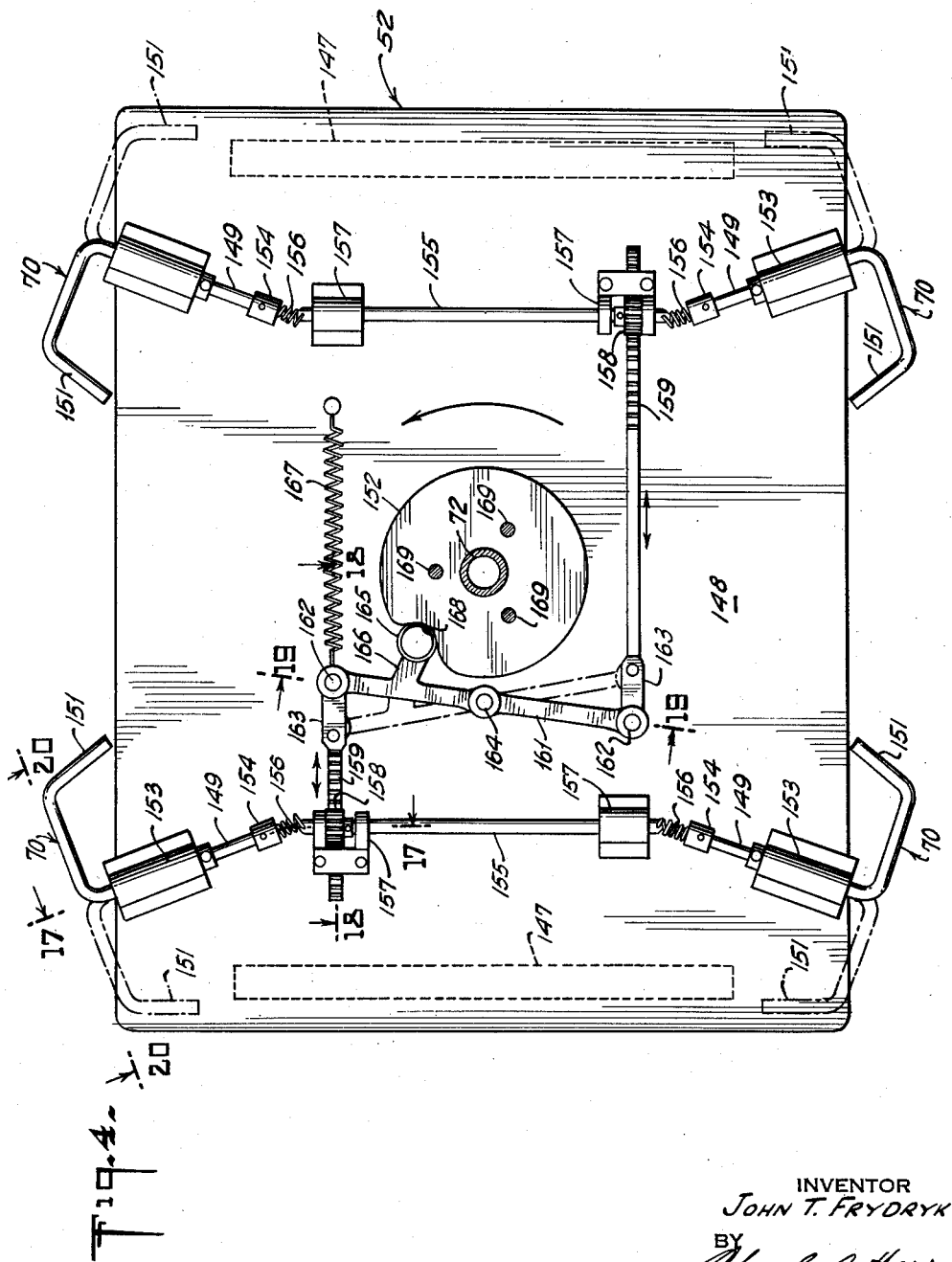
INVENTOR
JOHN T. FRYDRYK
BY
Charles A. Harris
ATTORNEY

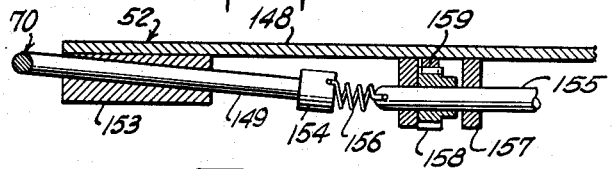
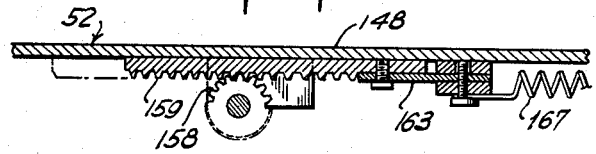
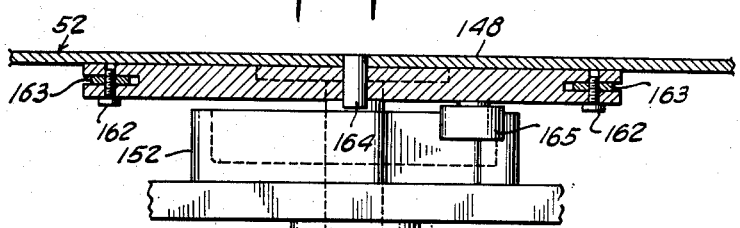
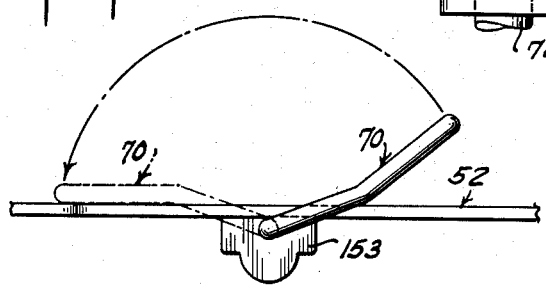
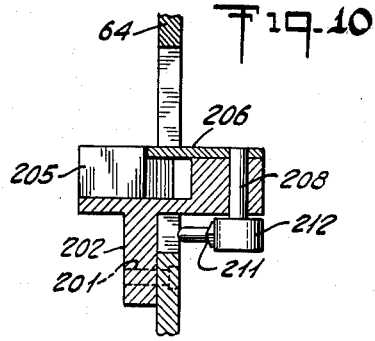
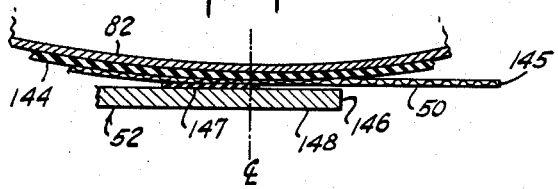
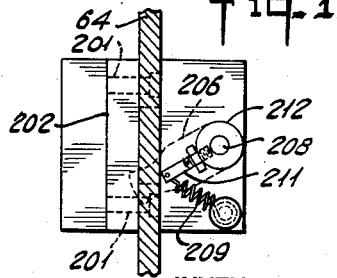
INVENTOR
JOHN T. FRYDRYK July 16, 1963 J. T. FRYDRYK 3,097,733
AUTOMATIC MACHINE
Filed Feb. 12, 1959 7 Sheets-Sheet 5

INVENTOR
JOHN T. FRYDRYK
BY Charles A. Harris
ATTORNEY

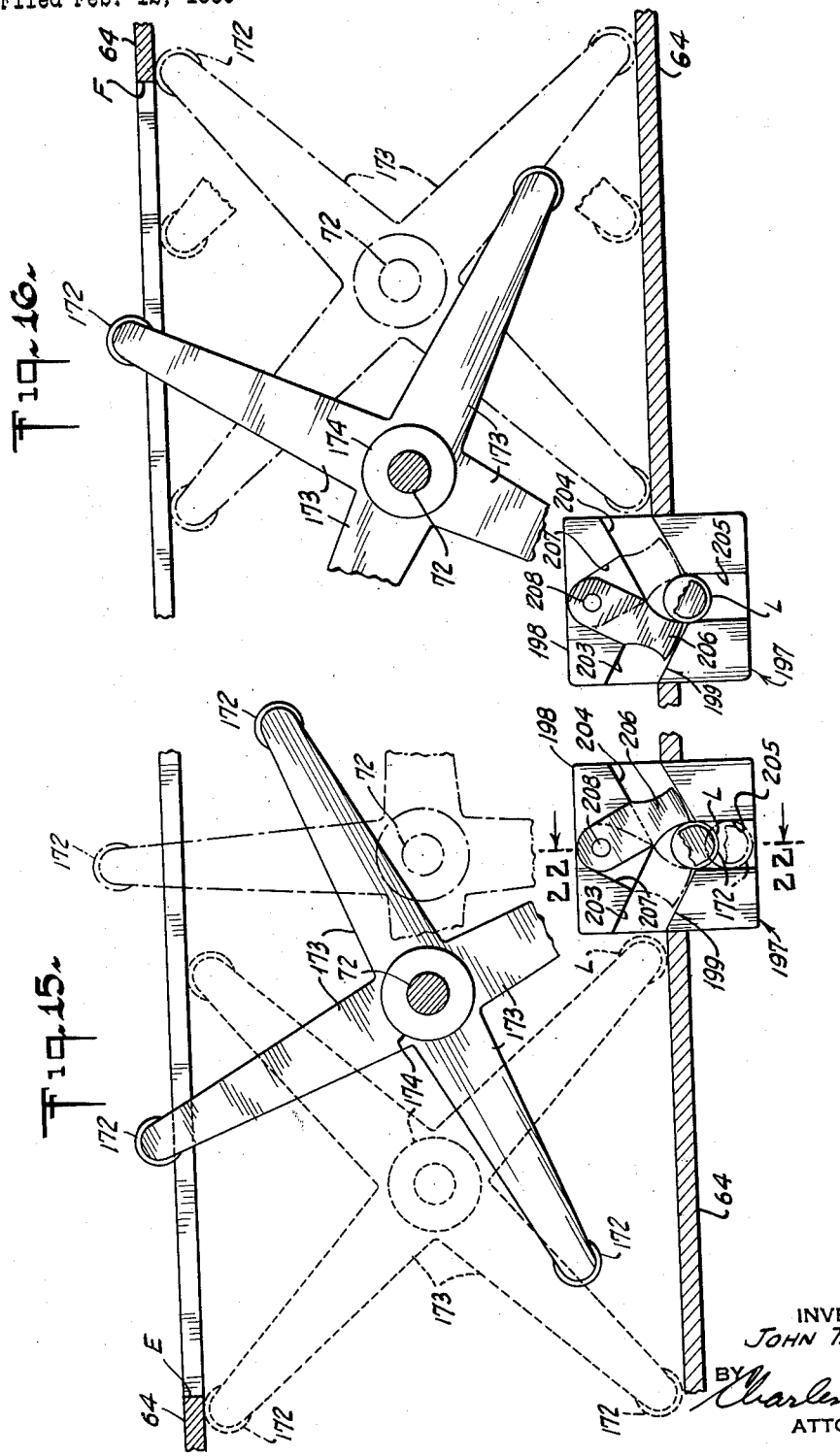

July 16, 1963

J. T. FRYDRYK 3,097,733

AUTOMATIC MACHINE

Filed Feb. 12, 1959

INVENTOR
JOHN T. FRYDRYK

BY
Charles A. Harris
ATTORNEY

United States Patent Office 3,097,733
Patented July 16, 1963

3,097,733
AUTOMATIC MACHINE
John T. Frydryk, Springfield, Mass., assignor, by mesne assignments, to Johnson & Johnson, New Brunswick, N.J., a corporation of New Jersey
Filed Feb. 12, 1959, Ser. No. 792,741
7 Claims. (Cl. 198—33)

The present invention relates to an automatic machine for conveying a plurality of individual pieces of sheet material cut from a strip of said material and presenting them for processing, more particularly to such a machine for processing relatively limp sheet material and a method therefor.

Heretofore, in processing relatively limp sheet material such as a layer or layers of woven diaper cloth, crib sheeting, or the like, it has been customary to cut the material in the desired lengths and then to trim and sew the individual lengths of material by hand to form the desired product.

One of the main problems in automatically processing successive sheets of relatively limp material such as diaper cloth is that the material, not only cannot be pushed, but must be held out flat to retain its proper dimensions. This particularly is true when it is desired to sew the front and rear edges of individual pieces of material successively cut from a longitudinally moving strip of material, for instance.

An additional problem in attempting to sew automatically the edges of a plurality of successively presented pieces of relatively limp material using conventional equipment is that the leading edge of each piece bends back and crumples and tends to provide an uneven stitched edge. In addition, the crumpled material tends to jam and prevent operation of the sewing machine.

It is one of the main objects of this invention to provide a novel method of automatically manufacturing products such as prefolded diapers, crib sheets, and the like fabricated from relatively limp sheet material, wherein successive pieces of the material are cut from a continuous strip while moving the pieces and the strip continuously linearly at the same speed and in the same direction, and their cut edges are processed while continuing the aforesaid linear motion of said pieces.

Another object of the invention is to provide such a method wherein the cut edges of the pieces are successively presented to a continuously operating sewing machine for stitching while moving the pieces in the direction of the edges at a substantially constant speed, and the edges are stitched while continuing this motion without crumpling the edges of the pieces or jamming the machine.

A further object of the invention is to provide an automatic machine for practicing the foregoing methods.

Thus, another object of the invention is to provide a novel automatic machine for conveying a plurality of individual sheets of material and presenting them for processing while moving the sheets continuously in a given linear path. I have invented a machine according to this object which comprises a plurality of spaced individual work supporting units flexibly connected in tandem with one another. The units are guided for motion in a desired path and are driven at a given linear speed in this direction. The individual work supporting units are capable of independent rotatable movement without varying their linear speed, and means are provided for continuously controlling the angular position of said units with respect to the direction of their linear motion. By varying the angular position of the units, different portions of the individual sheets supported by each of the units may be successively presented at one side of the machine.

A related object of the invention is to provide a novel means for turning and indexing a rotatable unit adapted for simultaneous linear movement in a direction normal to its axis of rotation.

Still another object of the invention is to provide an automatic machine for conveying and presenting individual sheets of material wherein the individual sheets are supported on spaced tables which are adapted to rotate to present different edges of the sheet to one side of the machine, and the sheets are positively held on the tables by clamps actuated by rotation of the table.

Other and further objects of the invention will be apparent from the following description and claims taken together with the drawings wherein:

FIG. 4 is a bottom plan view of one of the work supporting tables of the machine of FIGS. 1–3;

FIG. 5 is an enlarged view partly in section and partly in elevation showing one of the table clamps of FIG. 16 and taken along the line 5—5 of FIG. 4;

FIG. 6 is a similarly enlarged view along the line 6—6 of FIG. 4;

FIG. 7 is an enlarged view partly in section and partly in elevation taken along the line 7—7 of FIG. 4;

FIG. 8 is an enlarged inverted view in elevation taken along the line 8—8 of FIG. 4 showing the operation of on of the table clamps;

FIG. 9 is a very greatly enlarged sectional view showing the relationship between the cutting drum and one of the diaper supporting tables just as the table comes into contact with the leading end of one of the diapers being carried by the drum and just after the drum clamps which held this end of the diaper on the drum were released;

FIG. 10 is a view partly in section and partly in elevation taken along the line 10—10 of FIG. 15 and showing one of the turning and indexing units according to one embodiment of this invention;

FIG. 11 is a bottom view partly in section and partly in plan of one of these units;

FIG. 12 is a view partly in section and partly in elevation of one of the carriage units of the machine of FIGS. 1–3 and associated parts;

FIG. 13 is a bottom plan view partly in section and partly in elevation of one of the carriage links of the unit of FIG. 12 showing its connection to the drive chain for the carriage units;

FIG. 14 is a cutaway view partly in section and partly in elevation taken along the line 14—14 of FIG. 12 and showing the way in which the carriage links are supported on the top flanges of the side plates of the embodiment of FIG. 1;

FIG. 15 is a schematic top plan view partly in section showing how one of the work supporting units of the embodiment of the machine of FIGS. 1–3 is guided and turned by the side plates and the turning and indexing unit of this machine. This figure shows various positions of the associated parts as the follower connected to the work supporting unit enters the turning and indexing unit;

FIG. 16 is a view similar to that of FIG. 15 showing various positions of the indexing follower as it leaves the turning and indexing unit.

Figure 1:
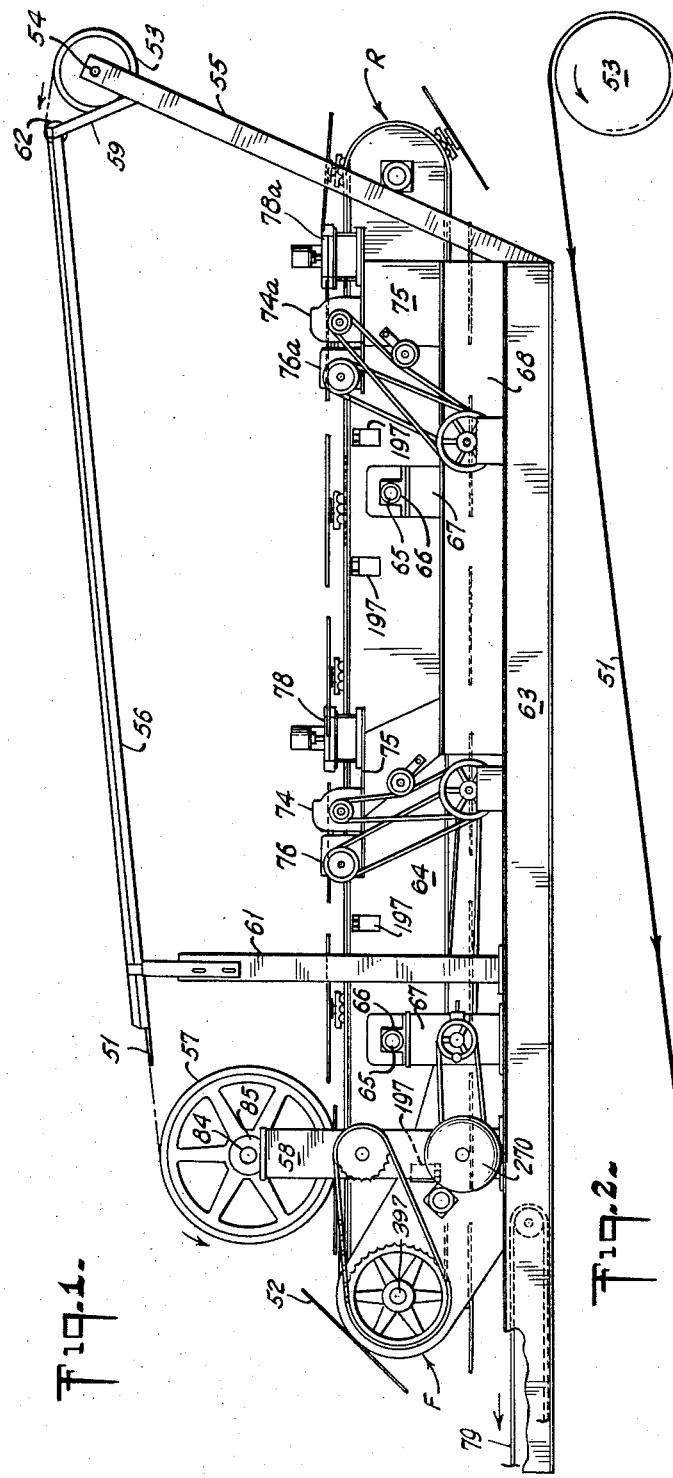
FIGURE 1 is a partially cutaway side elevational view of a machine for manufacturing diapers according to one embodiment of the invention.
Figure 2:
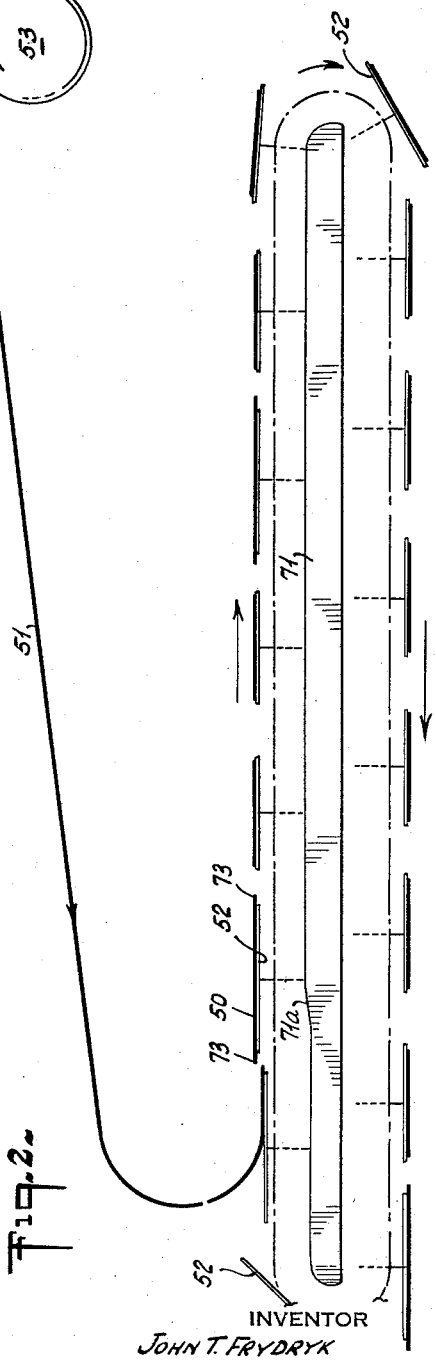
FIG. 2 is a schematic view partly in elevation showing various positions of the work supporting units of FIG. 1 and the diaper blanks passing through the machine. This figure also shows a longitudinal cam for determining the height of the blanks.
Figure 3:
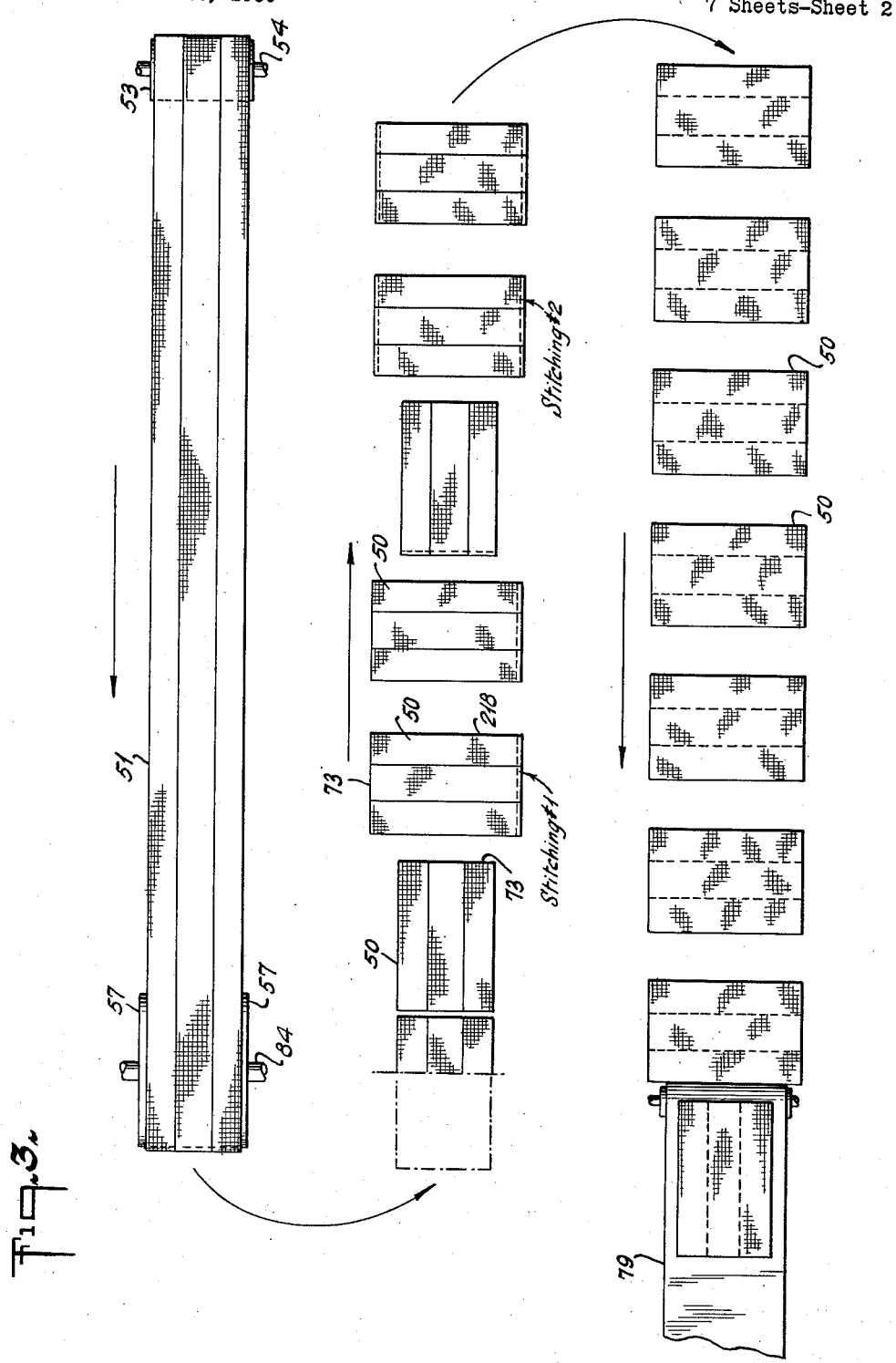
FIG. 3 is a schematic plan view of the strip of diaper material and the diaper blanks carried by the work supporting units in the various positions shown in FIG. 2.

Referring to FIGS. 1–3 of the drawings, there is shown an automatic machine for cutting and sewing the end edges of limp sheet products such as prefolded diapers and the like. The diaper blanks 50 are cut from a continuous strip 51 of diaper material moving in a given linear path at a constant speed after which they are positioned on work supporting tables 52 which support them in the flat and transport them through the various operations performed on the machine.

The strip 51 of diaper material is unwound from a supply roll 53 mounted for rotation on an axle 54 journaled in the upper ends of inclined uprights 55 extending from the base of the rear end of the machine. The strip is drawn from the supply roll along an overhead track 56 to a cutting drum 57 mounted on vertical posts 58 adjacent the front end of the machine. The track 56 is supported by extensions 59 on the inclined uprights 55 at the rear end of the machine and by vertical uprights 61 near the cutting drum 57. A guide roller 62 is provided at the rear end of the overhead track 56 for leading the strip 51 from the supply roll 53 onto the track.

The machine is supported on a pair of spaced longitudinal floor girders 63, one of which is not shown in FIG. 1, and is built around a pair of spaced side plates 64, as shown in FIGS. 1 and 12, which are mounted upon a pair of fixed supporting shafts 65 and extend the length of the machine. Each of the supporting shafts 65, in turn, is mounted in a shaft support 66 secured to the top of a vertical standard 67 which, in turn, rests upon the top of one of the longitudinal girders 63 at the front of the machine or the beam 68 resting on the longitudinal girders at the rear of the machine. Only one of the side plates 64 is shown in FIG. 1, since the other is spaced widthwise of the machine directly behind it.

The side plates 64 act as tracks for a number of the tables 52, or work supporting units, which are spaced longitudinally and connected in tandem with one another to form a continuous "chain" of tables. The tables are adapted for continuous motion in a top pass directly under the cutting drum 57 and along the tops of the side plates 64, then around one end of the plates and into a bottom pass upside down along the bottoms of the side plates until they reach the other end of the machine and then pass up around the ends of the plates and under the cutting drum 57 to repeat the aforesaid motion. During this motion the "chain" of tables is driven through connections to continuous drive chains 178 in a manner which will be shown and described more fully hereinafter.

The strip 51 is clamped to the cutting drum 57 and pulled around the drum. During the time it moves with the drum, the strip is cut into diaper blanks 50 by cutters associated with the drum. Each of the diaper blanks 50 is positioned on one of the tables 52 just as the table passes under the drum 57. The operation of the above-referred-to cutters and the manner of positioning the diaper blanks 50 on the table 52 are shown and described in detail in applicant's copending divisional application Serial Number 212,756, filed July 16, 1962. The surface of the drum 57 and the tables 52 both move in the same direction at the same linear speed, and the transfer is accomplished without interfering with this motion. The tables supporting the blanks continue forward at the same speed under the guidance of the side plates 64 and the longitudinal cam 71 shown in FIG. 2. Each of the tables 52 is secured to a vertical shaft 72 which rests on the top of the cam 71 during the top pass of the tables over the side plates 64, as shown in FIG. 12. The cam 71 has a rise 71a which lifts each succeeding table 52 slightly, shortly after it leaves the drum 57, as shown in FIG. 2. The raised tables then are rotated 90° while being moved forward at the same linear speed so that the cut edges 73 of the diaper blanks 50 now extend in the direction of the linear travel of the tables 52, as shown schematically in FIG. 3. As the tables 52 are turned, table clamps 70, shown in FIG. 4 but not shown in FIGS. 1–3, are actuated in a manner which will be described more fully hereinafter to hold the blanks 50 on the tables. The tables 52 continue to move linearly in the same path at the same linear speed to present one of the edges 73 of each of the diaper blanks 50 to a sewing machine 74 mounted at one side of the machine not far from the cutting drum 57. The machine is mounted on a foundation 75 which extends upwardly from the beam 68. The sewing machine 74 is of a type which is especially adapted to sew the edges of a piece of goods and is provided with a novel feeding device for feeding the edge of the diaper into and through the machine. This device is shown and described in detail in applicant's copending divisional application Serial Number 212,755, filed July 16, 1962. The speed of the feeding device corresponds to the linear speed of the diaper edge 73, and the sewing speed of the machine is adjusted accordingly. A speed controller 76 geared to the sewing machine 74 and connected to the same driving means as the sewing machine 74 is provided for adjusting feeding speed with respect to sewing speed. As shown in FIGS. 2 and 9, the cut edges 73 of the diaper blank 50 overlap the ends of the tables 52 to a certain extent so that the machine may stitch the edges 73 without contacting the ends of the tables. The sewing machine 74 operates continuously so that it makes a continuous stitch. When a diaper is passing through the machines 74, of course this stitch becomes a part of the diaper. However, a stitch chain or "tail" 77, not shown, is produced between adjacent diapers passing through the machine. A tail cutting unit 78 is provided for cutting this chain or strip 77 from the diapers. The unit 78 is located just following the sewing machine 74 and operates while the diapers still are turned 90° to their linear direction of travel.

Just after passing through the tail cutting unit 78, the tables 52 again are turned 90° in the same angular direction with the result that the diapers again extend in the direction of travel, but with their ends reversed. The tables 52 then are rotated an additional 90° so as to present the opposite end edge 73 of the diapers at the same side of the machine, as shown in FIG. 3. This occurs just before the diapers 50 reach a second sewing unit. This unit is identical with that described in connection with the first sewing machine 74 and consists of a sewing machine 74a, a speed controller 76a, and a tail cutter 78a which operate as just described in connection with the sewing machine 74, the speed controller 76 and the tail cutter 78.

The tables 52 pass around the side plates 64 at the rear end R of the machine and continue their travel upside down with the diapers normal to their path until they reach a point near the front end F of the machine where the tables again are rotated 90° in the same angular direction to assume their original position. As the tables are rotated at this point, the table clamps 70 are released and the diapers are dropped down upon a conveyer 79 which transports them away from the machine.

The tables 52 each are identical and comprise a plate 148 of metal or a similar rigid material which is rectangular in shape. The tables pass under the drum in such a way that the length of the rectangle extends lengthwise of the direction of travel of the tables and the drum surface. The width of the diaper blanks 50 is determined by the width of the strip 51 and their length by the distance between the cuts made on the drum 57. It follows that the blanks 50 are positioned lengthwise on the tables 52 or with their lengths extending lengthwise of the tables. The diaper blanks 50 are somewhat longer than the tables so that the blanks overlap the front and rear ends of the tables by a predetermined amount. For instance, to make a diaper blank about 21 inches long going into the sewing machine 74, the drum 57 is about 63 inches in circumference at the outer surface of the resilient layer 144; and the table 52 may be about 18½ inches long so as to provide an overlap of about an inch or an inch and a quarter at each end of the table. Normally, the diaper blanks 50 are slightly narrower in width than the table. For instance, the blanks may be about 14 inches wide when the tables are approximately 15 inches wide.

As shown in FIGS. 4–8, a table clamp 70 is provided at each corner of the table. Each clamp may be formed from a bent metal wire and is more or less C-shaped, with one leg of the C acting as an axle 149 for pivotal motion of the clamp and the other leg acting as a clamping bar 151 for holding the diaper 50 on the table. In FIG. 4, the clamps 70 are shown in full in their unclamped position and in phantom in their clamped positions.

The table 52 is secured to the vertical shaft 72 which, in turn, is caused to rotate at the appropriate time by means which will be described more fully hereinafter in such a way that it turns the table a predetermined angle, such as 90°, with respect to its original position. The shaft 72 extends through a table cam 152 which, in turn, moves linearly with the table but is fixed against rotative movement therewith. The table cam 152 is part of the carriage unit which is shown in FIGS. 12–14 and will be described more fully in connection with these figures. Each of the clamps 70 is mounted in an inclined bushing 153 secured at an angle to an edge portion of the underside of the table. A portion 154 of larger diameter at the inner end of each clamp 70 is connected to a transverse shaft 155 which connects the clamps at each end of the table. The clamps 70 are connected to the shafts 155 by flexible spring connectors 156, and the shafts 155 are mounted for rotation in similar bushings 157 attached to the underside of the table. The bushing 157 at one end of each of the shafts 155 is slit to provide a housing for a gear 158 which is keyed to the shaft 155. Riding underneath each of the gears 158 and meshing therewith is a separate rack 159 which slides along the underside of the bottom of the table. The racks 159 are connected to opposite ends of a cam follower rocker arm 161 by pins 162 which extend from a link 163 at the end of the rack into a hole at each end of the rocker arm 161. The rocker arm is mounted on a stub shaft 164 which is tapped into the table and extends downwardly therefrom. The stub shaft 164 may be in the form of a screw having a head which holds the rocker arm 161 against the bottom of the table. A cam follower 165 for the table cam 152 is mounted on a leg 166 extending from one side of the rocker arm 161, and a tension spring 167 secured to the bottom of the table is attached to the adjacent end of the rocker arm 161 so that the cam follower 165 normally is urged into contact with the table cam 152. The table cam 152 is almost circular in shape but has one depression 168 which corresponds with the unclamped position of the table clamps 70. If the table 52 is turned with respect to the table cam 152 so that the cam follower 165 can enter the depression 168, it will do so since it is urged in that direction by the tension spring 167. This will move both of the racks 159 inwardly of the shafts 155 to rotate each of the clamps 70 into their unclamped position. This position of the table cam 152 with respect to the cam follower 165 corresponds to the position of the table as it passes underneath the cutting drum 57. As the table 52 makes the first 90° turn preceding the first sewing machine 74, it turns with respect to the table cam 152; and the follower 165 rises onto the circular portion of the cam 152 and moves the racks 159 so as to rotate the table clamps 70 to their clamping position, as shown in phantom in FIGS. 4–8. The clamps remain in this position until the tables again are rotated to their original positions at the underside of the front end of the machine just before they again approach the cutting drum. Roughened portions or prongs, not shown, may be provided on the underside of the clamps 70 adjacent their ends to assist in holding the diapers 50 more firmly in position on the tables 52 during processing.

The relationship between each of the tables 52 and its respective carriage unit is shown most clearly in FIGS. 12–14. As mentioned hereinbefore, the table 52 or work supporting unit, is secured to a vertical shaft 72 which extends downwardly through a carriage unit until it finally contacts the top of the longitudinal cam 71 in the top pass of the work supporting units over the side plates 64. The vertical shaft 72 is secured to the table centrally thereof by screws 169 or the like extending through a circular plate 171 fixed to the top of the shaft. Four roller followers 172 are connected to the work supporting unit through a corresponding set of four guide arms 173 mounted on the vertical shaft 72 near the bottom end of the shaft. The guide arms 173 are integral with and extend from a hollow sleeve 174 fixed to the vertical shaft 72 and extend outwardly from the sleeve at 90° to one another with relation to the shaft. Each of the roller followers 172 is rotatably mounted adjacent the end of one of the guide arms 173 on a short stub shaft 175 which enters a hole in the arm. The lengths of the arms 173 and the location of the rollers 172 on the arms is such that the rollers are positioned as on the corners of a square and at 90° from one another with respect to the vertical table shaft 72. The roller followers 172 normally run in contact with the inside surface of the side plates 64 for guiding the linear movement of the tables 52 and retaining them in a given angular position as will be described more fully hereinafter.

Each of the carriage units comprises a carriage link 176 which is mounted for linear movement on the flanges 177 extending inwardly from the side plates 64 and is secured at its ends to continuous drive chains 178 which move the unit linearly. The link has an integral cylindrical base 179 which extends downwardly from the center of the link, and both the link itself and the base have a cylindrical opening for receiving the vertical shaft 72. As mentioned hereinbefore, the table cam 152 is secured to the link 176 by means such as bolts 181 or the like; and it also has a central opening for receiving the vertical table shaft 72. A steel collar and spacer 182 is fitted through the carriage unit in the holes defined in the table cam 152, the link 176, itself, and its cylindrical base 179, and the internal diameter of the collar 182 conforms to the diameter of the table shaft 72 so as to provide a bushing for the shaft. The collar 182 also extends beyond the bottom of the cylindrical base 179 to act as a spacer which holds the hollow sleeve 174 attached to the bottom of the table shaft away from the cylindrical base as necessary during the bottom pass of the tables 52.

The links 176 are mounted for movement along the tracks defined by the side plates 64 and the flanges 177 extending inwardly from their top and bottom edges on two top traveller rollers 183 and one bottom traveller roller 184 which normally are in rotatable contact with the flanges 177 at each side of the links 176. There are identical traveller roller units at each side of each link 176 so that they will be described with reference to only one unit. The two rollers 183 are mounted to ride on top of the side flange 177 during the top pass of the tables 52, or on the bottom of the flange during the bottom pass of the tables, and are mounted for rotation directly in bosses 185 formed in the side of the link. The top traveller rollers 183 are spaced from one another in the direction of travel of the link 176, one being adjacent the leading edge and the other being adjacent the following edge of the link. The top rollers 183 are mounted for rotation on short stub shafts 186 which are screwed into the aforesaid bosses 185. A slot is provided in the link extending longitudinally through one of the bosses to receive the end of a gripping arm 187 which supports the bottom traveller roller 184. The stub shaft 186 extending through this one of the bosses 185 acts as an axle for the gripping arm 187 and extends through a hole provided for this purpose in the end of the arm. The bottom traveller roller 184, in turn, is mounted for rotation in a stub shaft 188 bolted through the gripping arm 187 and is located lengthwise of the link more or less halfway between the two top rollers 183. The gripping arm 187 is pivoted in the above-described mounting so that the bottom roller 184 may be moved toward and away from the link by rotation of the arm 187 in its mounting. The two top traveller rollers 183 and the bottom traveller roller 184 are arranged to grip one of the flanges 177 extending inwardly from its side plate 64, as shown most clearly in FIGS. 12 and 14. The two top rollers 183 ride on top of the flange 177, and the bottom roller 184 rides under the flange. To assure that the rollers grip the flange, the free end of the gripping arm 187 is spring urged towards the link 176. This is accomplished by a compression spring 189 which is mounted on a bolt 191 which extends through a hole in the gripping arm and is threaded into a tapped hole 192 in the link 176. The spring 189 is fitted between a collar 193 on the bottom end of the bolt 191 and the underside of the gripping arm 187 so that it normally urges the arm upwardly towards the link.

The flanges 177 at the top and bottom of the side plates 64 do not extend around the curved ends of the side plates but terminate where the curves begin. To assure that the motion of the carriage units around the side plates will not be retarded because the flanges 177 at the top or bottom of the side plates, depending upon whether the unit is beginning its top or its bottom pass, cannot enter between the top traveller rollers 183 and the bottom traveller roller 184, means are provided for holding the gripping unit open. This consists of a set screw 194 which is tapped into the free end of the gripping arm 187 and extends upwardly so that it will contact one of the bosses 185 on the carriage link 176. The set screw 194 is adjusted so that it will not contact the carriage link 176 when the traveller rollers are opened wide enough to grip one of the flanges 177, but will contact the link when the compression spring 189 moves the bottom roller 184 closer to the link after the link leaves one end of one of the flanges.

Each of the drive chains 178 is secured to each end of the link 176 by a screw 195 welded to the chain and tapped into rod-like extensions 196 forming the ends of the link. The chains are held in position by their attachment to each of the various carriage links 176 and are driven from a pair of sprockets, not shown, located one on each side of the machine. The sprockets are mounted on a common shaft 197 which is driven in a manner which will be described more fully hereinafter.

The method and the means by which the table, or work supporting unit, 52 is guided in its path of linear movement and rotated with respect thereto is best shown in FIGS. 10, 11, 15, and 16. As mentioned hereinbefore in describing the four follower rollers 172 mounted at the ends of their respective guide arms 173, the rollers are spaced equiangularly about the table shaft 72 and extend at 90° to one another from the hollow sleeve 174 which is fixed to the table shaft 72, and each of the tables 52 is guided in its linear movement in a given path determined by the side plates 64. Two of the follower rollers 172 always are in contact with one of the side plates 64 while the other two follower rollers 172 are in contact with the other side plate 64, except when one of the follower rollers is under control of one of the turning and indexing units 197. There are four turning and indexing units 197, all located in the right-hand side plate, three adjacent the top of the plate and designed to operate during the top pass of the tables, and one adjacent the bottom of the plate near the front end of the machine and designed to operate during the bottom pass of the tables, as may be seen from FIG. 1.

The operation of all of the turning and indexing units will be described in connection with one of the units 197 as follows. The unit is in the form of a block 198 which fits into an opening in the right side plate. The block 198 protrudes inwardly of the side plate and has a passage 199 which communicates with the front and rear edges of the block and is opened to the top of the block. The block 198 is held in position on the side plate 64 by two screws 201 extending into the side plate from a flange 202 depending from the block. The block 198 and the passage 199 in the block are so located that, as one of the tables and its corresponding guide arms 173 and follower rollers 172 move forward linearly with its rollers in contact with the side plates 64, the leading roller L in contact with the right side plate enters the front end of the passage 199 in the block 198.

The top surface of the block 198 is located below the guide arms 173 and the side plate 64 is cut out above the block so as to allow the arms to pass over the block when the lead roller L is under control of the passage 199 in the block. The left side plate 64 is relieved or cut out between the points E and F so as not to contact the follower rollers 172 on the left side of the machine when one of the follower rollers on the right side of the machine is under control of the passage 199 in the turning and indexing block 198. Looking at the top of the block, the passage 199 in the block is Y-shaped with the portions 203 and 204 communicating with the front and rear edges of the block, respectively, forming the top of the Y and another portion 205 extending outwardly of and normal to the right side plate forming the base of the Y. It is the purpose of the block 198 to hold the roller L so that the guide arms 172 will pivot 90° as the table and carriage unit pass the block. This is accomplished without disturbing the straight line linear movement of the center of the table and carriage unit, this point being represented by the vertical table shaft 72. The leading follower roller L enters the top 203 of the Y-shaped passage at the front edge of the block moving outward slightly along this side of the top of the Y and then moves out into the base 205 of the Y. When under control of this part 205 of the Y-shaped passage, the roller L can only move in a direction normal to the linear movement of the tables. Thus, the roller is held effectively against motion in the direction of the path of the tables.

To assure that the leading roller L moves from the front portion 203 of the top of the Y-shaped passage into the base 205 of the Y, a swinging gate 206 is provided. The gate is in the form of a plate which is fitted in a recess 207 in the top of the block and mounted for pivotal movement on a pin 208 located on the transverse centerline of the block near its innermost edge. The recess 207 is shaped to allow the gate 206 to swing from one position where it blocks off the front half 203 of the Y-shaped passage to another position where it blocks off the rear half 204 of the Y-shaped passage. The gate 206 normally is urged by a tension spring 209 into the position where it blocks off the front half 203 of the passage. As shown in FIGS. 10 and 11, the tension spring 209 attached to the underside of the block pulls upon a lever 211 extending from a collar 212 fixed to the bottom of the pivot pin 208 for this purpose. The front and rear edges of the gate 206 where it extends into the passage 199 are curved to provide a curved corner in the passage, as shown best in FIGS. 15 and 16. As the leading roller L enters the front half 203 of the top of the Y-shaped passage, it contacts the gate 206 shown in phantom in this position in FIG. 15 and pushes it into the position shown in full in FIG. 15 where it blocks off the rear or exit portion 204 of the top of the passage. When the table has reached the position in its linear path that causes the roller L to move inwardly in the base 205 of the passage and finally out of the block through the rear, or exit, portion 204 of the top of the passage, the roller L is free to do so because the gate 206 will have moved back to its original position, that shown in full in FIG. 16, under the pull of the spring 209. Thus, the table 52 is effectively rotated 90° while moving linearly in the same straight line path and at the same speed as it was when all four rollers 172 were in contact with the two side plates 64. It should be noted that the relieved portion of the left side plate 64 terminates at the point F where the new leading roller 172 on the left side of the machine is located when the roller L passing through the block 198 leaves the exit portion of the passage 199. Thus, at least three of the rollers 172 are in contact with the side plates 64, two on one side of the machine and one on the other; or one of the rollers is under the control of the turning and indexing unit 197 at all times during the operation of the machine. In this way, the tables 52 are accurately guided in a definite linear path and are rotated with respect to this path without affecting the direction of their linear movement or their speed in this direction.

Figure 17:
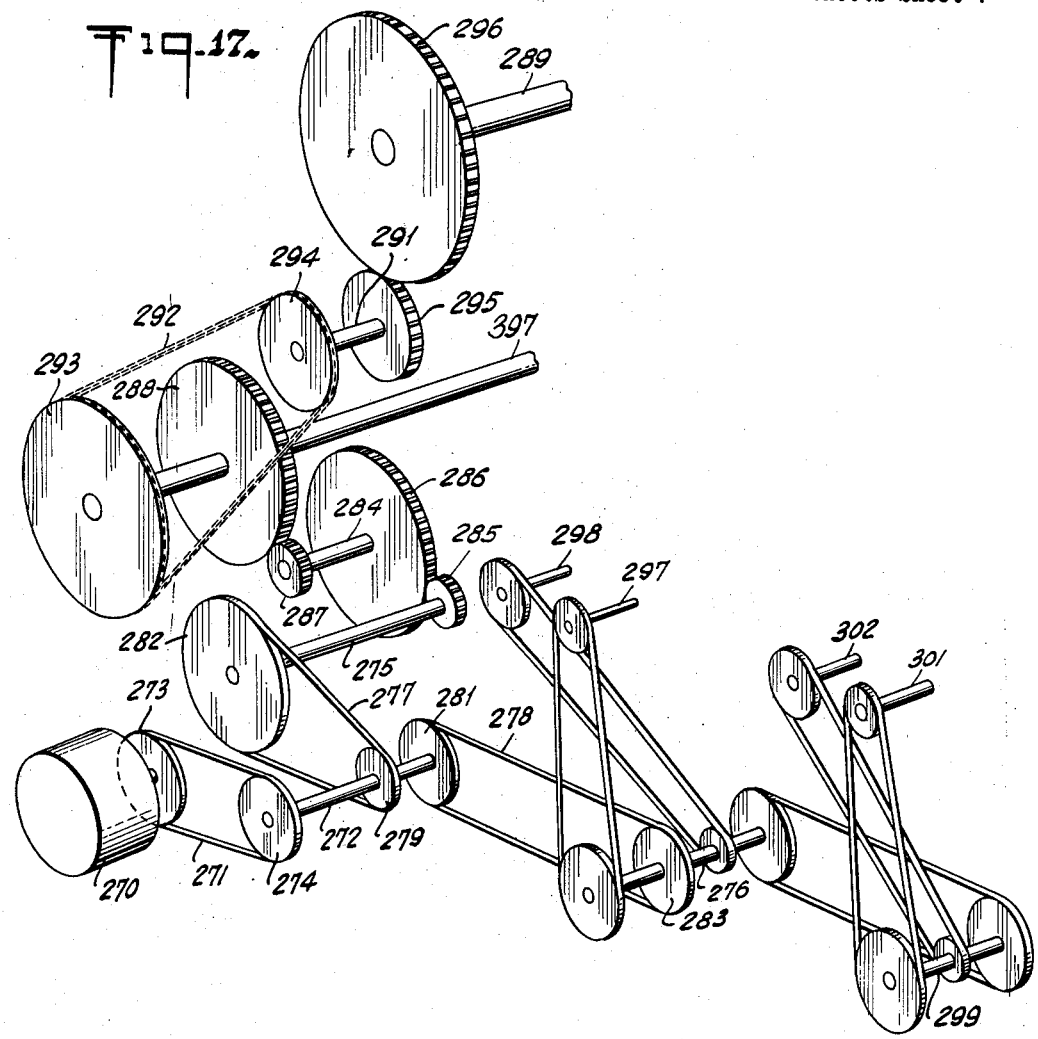
FIG. 17 is a schematic view in perspective of an electric motor and the various drive gears and shafts for the units associated with the machine of FIG. 1.

The operation of the various parts of the machine of this invention may be timed with respect to one another by various conventional devices and techniques. For instance, driving mechanisms are shown in FIG. 17 wherein all of the parts are driven from a single motor 270. The motor drives a belt 271 which, in turn, drives an intermediate shaft 272 through pulleys 273 and 274 on the motor shaft and the intermediate shaft. The intermediate shaft 272 drives a pair of secondary shafts 275 and 276 through two more belts 277 and 278 connected to the intermediate shaft 272 through pulleys 279 and 281 on the intermediate shaft and pulleys 282 and 283 on the secondary shafts 275 and 276. The secondary shaft 275 drives an idler shaft 284 which, in turn, drives the main drive shaft 397 for the two continuous carriage unit drive chains 178. This is accomplished through a series of meshing gears, 285 on the shaft 275, 286 and 287 on the idler shaft 284, and 288 on the drive shaft 397. Sprocket wheels, not shown, are mounted on the drive chain shaft 397 for driving the chains 178. A drum drive shaft 289 is driven through another idler shaft 291 from the drive shaft 397 through a belt 292 passing around a pair of pulleys 293 and 294 mounted on the main drive shaft 397 and the idler shaft 291, respectively, and a gear 295 on the idler meshing with a gear 296 on the drum drive shaft. The secondary shaft 276 drives the first sewing machine drive shaft 297 and the first speed regulating unit drive shaft 298, as well as a tertiary shaft 299. This is accomplished through a series of pulleys and belts connecting the respective shafts. The tertiary drive shaft drives power shafts 301 and 302 for the second sewing machine and the second speed regulating unit, respectively, through a pair of belts passing over pulleys secured to the respective shafts. The size and arrangement of pulleys and gears is designed to provide the desired speed relationships between the various parts. Where regulation is desirable as for the sewing machine feeding devices, additional speed regulators are provided. Other parts of the machine which are not directly connected to the above-described driving arrangement are operated by cams or other devices which are actuated by the movement of parts driven from one of the connected mechanisms in a manner described hereinbefore.

Having now described the invention in specific detail and exemplified the manner in which it may be carried into practice, it will be readily apparent to those skilled in the art that innumerable variations, modifications, applications, and extensions of the basic principles involved may be made without departing from its spirit and scope.

The invention claimed is:

1. Means for turning and indexing a rotatable unit adapted for simultaneous linear movement in a given path normal to its axis of rotation, which comprises track means for retaining said unit in a given angular position with respect to its direction of rotation, a follower connected to said unit for cooperating with said track means for controlling the angular position of said unit, indexing means for blocking the forward linear motion of said follower while allowing it to move transversely of said path, said indexing means defining a Y-shaped passage having a base portion extending normal to said path, an entrance portion formed by one half of the top of the Y and an exit portion formed by the other half of the top of the Y, said follower being adapted first to enter the entrance portion of the passage and then to enter the base of said passage where the follower can move in a direction normal to said path but not parallel thereto, said follower moving outwardly in said base as the axis of said rotatable unit approaches said indexing means and inwardly in said base as said axis leaves said indexing means until the follower enters the exit portion of said passage and leaves the indexing means, whereby said unit is caused to rotate a predetermined angle with respect to its original angular position, and track means for retaining said unit in its new angular position as it continues its linear motion in said path.

2. Means for turning and indexing a rotatable unit according to claim 1, which further comprises a swinging gate mounted for rotation from one position where it blocks said entrance portion to another position where it blocks said exit portion of the Y-shaped passage, said gate normally being urged to the position wherien it blocks said entrance portion, the movement of said follower into said entrance portion swinging said gate to the position wherein it blocks said exit portion and thereby guides the follower into the base portion of said passage, the gate returning to its normal position blocking the entrance portion of said passage after the follower enters said base portion.

3. Means for turning and indexing a rotatable unit adapted for simultaneous linear movement in a given path normal to its axis of rotation, which comprises spaced tracks for guiding said unit for movement in a given linear path, a set of at least three followers connected to said unit and normally adapted to run two in contact with one of the tracks and at least one in contact with the other of the tracks, the followers in said set being spaced angularly about the axis of said unit by at least 90° from one another, indexing means adapted to receive the leading follower in contact with the first-mentioned track, said indexing means having a lateral passage extending normal to said linear path in which the leading follower can move laterally outwardly and inwardly but not in a direction parallel to said path, said indexing means being adapted to cause said leading follower to enter said passage and move outwardly therein as the axis of rotation of the rotatable unit approaches the indexing means and then inwardly in the passage and away from the indexing means as the rotatable unit leaves the indexing means, the second track being relieved in the area of said indexing means, whereby the rotatable unit is turned about its axis a predetermined angle with respect to its original angular position as the unit is moved forward linearly, said tracks continuing beyond said indexing means for guiding said followers in their new positions in the continued linear movement of said unit and said leading follower continuing to run in contact with said first-mentioned track during said continued linear movement.

4. Means for turning and indexing a rotatable unit according to claim 3, wherein said set comprises four followers normally adapted to run two in contact with each of the tracks and the followers are spaced 90 degrees apart about the axis of rotation of the unit.

5. Means for turning and indexing a rotatable unit according to claim 4, wherein the followers are rollers mounted to rotate in the ends of a corresponding set of four arms extending at 90 degrees with respect to one another about said axis.

6. A work supporting unit comprising a table mounted for rotation in a carriage unit guided for linear movement in a given path, said table normally being guided so that it will move linearly with the carriage without rotating with respect thereto, rotatable clamps for holding work on said table, means for causing said table to rotate with respect to said carriage at a given point in the linear path of said carriage, and means actuated by the rotation of said table with respect to said carriage at this point for rotating said clamps into clamping position for holding work on said table.

7. A work supporting unit comprising a table mounted for rotation in a carriage unit guided for linear movement in a given path, said table normally being guided so that it will move linearly with the carriage without rotating with respect thereto, movable clamps for holding work on said table, means for causing said table to rotate with respect to said carriage at a given point in the linear path of said carriage, and means actuated by the rotation of said table with respect to said carriage at this point for moving said clamps into clamping position for holding work on said table.

References Cited in the file of this patent

UNITED STATES PATENTS

| | | |
|---|---|---|
| 1,096,075 | Traver | May 12, 1914 |
| 1,539,128 | Loeb | May 26, 1925 |
| 2,264,032 | Webb | Nov. 25, 1941 |
| 2,431,888 | Pick | Dec. 2, 1947 |
| 2,520,002 | Gerstein | Aug. 22, 1950 |
| 2,570,444 | Henkel | Oct. 9, 1951 |
| 2,674,965 | McInerney et al. | Apr. 13, 1954 |
| 2,699,247 | White | Jan. 11, 1955 |
| 2,706,031 | Capstack et al. | Apr. 12, 1955 |
| 2,713,904 | Ostuw et al. | July 26, 1955 |
| 2,871,727 | Malick | Feb. 3, 1959 |
| 2,928,222 | Lindstaedt | Mar. 15, 1960 |